UNITED STATES PATENT OFFICE.

JOHN CONNERY, OF ST. LOUIS, MISSOURI.

MEDICATED AIR COMPOUND.

1,035,536. Specification of Letters Patent. Patented Aug. 13, 1912.

No Drawing. Application filed June 5, 1909. Serial No. 500,264.

*To all whom it may concern:*

Be it known that I, JOHN CONNERY, a citizen of the United States, and a resident of St. Louis, in the State of Missouri, have invented a new and useful Improvement in Medicated Air Compounds, of which the following is a full, clear, and exact description.

This invention relates to a new compound and the method of making the same.

The object of the invention is to provide an atmosphere in a suitable inclosure or room impregnated with suitable chemical particles of dust, which co-act one with the other, purifying and impregnating the air, and which are adapted to be breathed, with the air, into the lungs of animals.

The compound consists, broadly speaking, in air impregnated with a dust consisting of salts of calcium, potassium, sodium, and mercury, mixed in suitable proportions with lavender. The method of making the same consists in shaking the finely powdered ingredients in a suitable porous receptacle or other maens of agitation, in a body of air which is to be impregnated.

This compound is especially useful in connection with pulmonary diseases and diseases where there are large amounts of impurities in the blood and in the system. The medicated air has a sedative and soothing action on the breathing passages and organs, besides entering through the lungs into the circulation of the blood, where its effect will be most beneficial in removing the impurities from the blood and organs of the system, and depositing them with an excess of secretive juice in the intestines, where they may be readily gotten rid of.

The particular ingredients of my compound are preferably air, slaked lime, permanganate of potash, sea-salt, crushed lavender leaves, mercurous iodid, mixed so as to form varying combinations, of which the following is preferable:—Air, 100,000 parts; slaked lime, 100 parts; permanganate of potash, 1 part; sea salt, 1 part; crushed lavender leaves, 10 parts; mercurous iodid, $\frac{1}{10}$ part.

The method of mixing the ingredients consists in finely powdering them separately, and then stirring together in a suitable porous receptacle, such as a knit linen bag, and the bag is then shaken in a suitable receptacle containing a fluid, such as air. The amount of dust with which the air is to be laden varies according to the purpose to which it is to be put. The bag may be located in a ventilating shaft and serve to saturate all the air that passes therethrough with the ingredients of the compound.

The combining and use of the several ingredients in the manner described will produce a suspended mixture of ingredients in air for breathing purposes, so that they will be readily assimilated by animals breathing said air, and introduced into the system in a positive and yet gentle manner.

While I prefer to employ the ingredients and the proportion of ingredients above stated, I may substitute the known equivalent for said ingredients of this composition, varying the proportions of said ingredients and in some cases omitting one or more of them, as specifically detailed in certain of the appended claims, without departing from the spirit of this invention.

Having thus described my invention, I claim as new and desire to secure by Letters Patent:—

1. A medicated compound including slaked lime, permanganate of potash, sea-salt, lavender, and mercurous iodid mixed in a finely divided condition.

2. A medicated compound, including lime, sea salt, crushed lavender leaves, a halogen salt of mercury, and permanganate of potassium.

In testimony whereof I have signed my name to this specification in the presence of two subscribing witnesses.

JOHN CONNERY.

Witnesses:
WM. R. GILBERT,
M. W. LEFTWICH.